T. W. McDILL.
CULTIVATOR.
No. 190,606. Patented May 8, 1877.
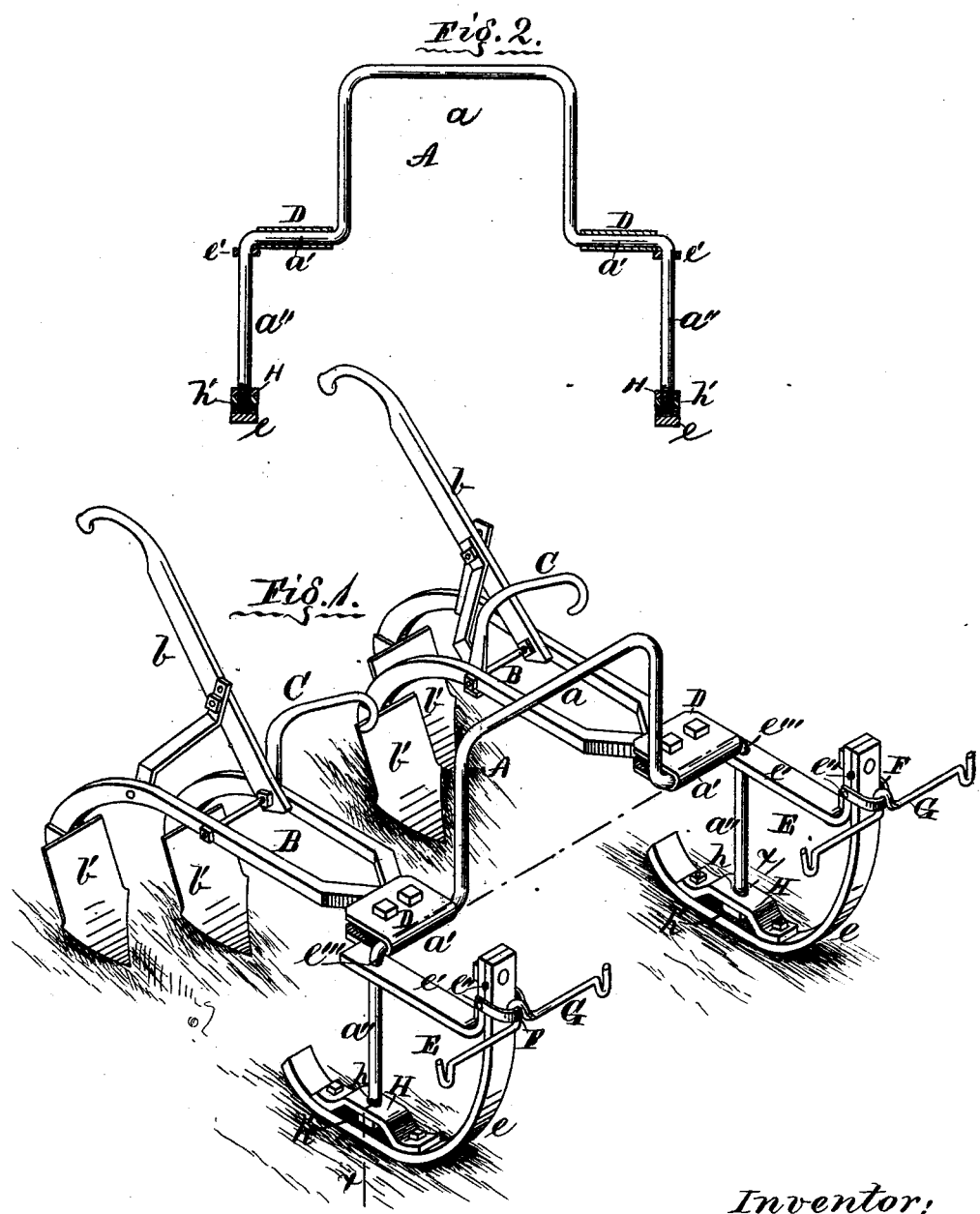

UNITED STATES PATENT OFFICE.

THOMAS W. McDILL, OF BATAVIA, IOWA.

IMPROVEMENT IN CULTIVATORS.

Specification forming part of Letters Patent No. 190,606, dated May 8, 1877; application filed April 7, 1877.

*To all whom it may concern:*

Be it known that I, THOMAS W. McDILL, of Batavia, in the county of Jefferson and State of Iowa, have invented certain new and useful Improvements in Cultivators; and I do hereby declare that the following is a full, clear, and exact description thereof, which will enable others skilled in the art to which it appertains to make and use the same, reference being had to the accompanying drawings, and to letters of reference marked thereon, which form a part of this specification.

This invention relates to improvements in that class of implements known as "tongueless cultivators;" and consists in certain improvements in the construction of the yoke or elevated cross-bar, to which the plow-beams and runners are connected, as hereinafter more fully set forth.

In the accompanying drawing, Figure 1 is a perspective view of a cultivator embodying my invention. Fig. 2 is a sectional view in the line $x\ x$ in Fig. 1, showing an elevation of the beam-yoke.

Referring to the parts by letters, letter A represents the beam-yoke, formed of a bar of iron, or other suitable material, having an elevated central portion, $a$, horizontal portions $a'\ a'$ for the attachment of the plow-beams, and vertical portions $a''\ a''$ for the attachment of the supporting-runners. B B are the cultivator-plows, which may be of any ordinary kind, and have handles $b$ and shovels $b'$, and a hook-rod, C, extending upward from each beam. The plow-beams are hinged so as to have lateral movement and lateral adjustment to plates D, which plates D embrace the horizontal parts $a'$ of the beam-yoke, so as to permit vertical movement of the plow-beams.

The supporting-runners E are constructed, as plainly shown at Fig. 1, with a curved runner portion, $e$, and an upper portion, $e'$. The forward portions of the part $e'$ and part $e$ are extended upward and pierced with holes $e''$ for the reception of a clevis, F, or other device, to which the draft-bars G may be attached. H is a plate attached to the runner $e$, its central portion curved upward, and having a hole, $h$, for the reception of the lower end of the beam-yoke, which passes through said plate H, and is secured therein by a nut, $h'$.

The beam-yoke A is hinged to runners E by passing through holes $e'''$ in the rear ends of the parts $e'$, and through the holes $h$ in the plates H, so that either runner E, with its adjacent plow, may be advanced or receded with its respective end of the beam-yoke without disturbing the parallelism of the runners, or interfering with the vertical or lateral movements of the plow-beams.

The relation of the draft to the parts may be adjusted by adjusting the draft-bars higher or lower in the holes $e''$, so as to reduce the friction of the supporting-runners E upon the soil to a minimum quantity.

For the local transportation of the cultivator the rear ends of the plows may be elevated, and the hooks C engaged with the upper portion of the beam-yoke A, in which position the weight of the plows will tend to turn the beam-yoke and runners over backward; but the forward draft of the team on the runners will restore the parts to an upright position.

It will be seen that the within-described construction of beam-yoke permits of journaling the supporting-runners E directly to said beam-yoke, and in a manner to permit of the movements hereinbefore referred to, and also of independent lateral flexure or oscillation of said runners on their axes of flexure upon the beam-yoke.

What I claim as new, and desire to secure by Letters Patent, is—

The beam-yoke A of a tongueless cultivator, constructed substantially as described, with an elevated central portion, $a$, horizontal portions $a'$ for the attachment of the plow-beams, and vertical portions $a''$, to which the runners E may be directly hinged or journaled, substantially as described, and for the purpose specified.

In testimony that I claim the foregoing as my own I affix my signature in presence of two witnesses.

THOMAS W. McDILL.

Witnesses:
P. R. RICHARDS,
THOMAS McKEE.